United States Patent [19]

Shur et al.

[11] Patent Number: 5,636,920
[45] Date of Patent: Jun. 10, 1997

[54] SPORTS TEAM ORGANIZER

[75] Inventors: Shlomo Shur; Israel Hersh, both of Fairfield; Amiel Dabush, Weston, all of Conn.

[73] Assignee: Sports 'N' Kids, L.L.C., Weston, Conn.

[21] Appl. No.: 331,376

[22] Filed: Oct. 28, 1994

[51] Int. Cl.$^6$ .................................................. A63F 9/24
[52] U.S. Cl. ................................................ 364/410; 463/1
[58] Field of Search ................................ 364/410, 411; 463/1, 43; 273/433

[56] References Cited

U.S. PATENT DOCUMENTS

| | | |
|---|---|---|
| 4,266,214 | 5/1981 | Peters, Jr. ............................ 364/410 |
| 4,977,503 | 12/1990 | Rudnick et al. ...................... 364/410 |
| 5,153,826 | 10/1992 | Johnson ............................... 364/410 |
| 5,187,789 | 2/1993 | O'Hair . |
| 5,245,537 | 9/1993 | Barber . |
| 5,263,723 | 11/1993 | Pearson et al. . |
| 5,269,519 | 12/1993 | Malone . |
| 5,277,426 | 1/1994 | Gerpheide et al. . |
| 5,283,732 | 2/1994 | Mauritz . |
| 5,325,292 | 6/1994 | Crockett . |
| 5,359,510 | 10/1994 | Sabaliauskas . |
| 5,412,188 | 5/1995 | Wily .................................... 364/411 X |

*Primary Examiner*—Jessica Harrison
*Assistant Examiner*—Michael O'Neill
*Attorney, Agent, or Firm*—Dilworth & Barrese

[57] ABSTRACT

A computer-based system and method is disclosed for organizing a sports team, including a memory for storing roster information with player position data and biographical data for a plurality of players; stored programs including a lineup optimizer program; and a processor operating with the stored programs for processing the roster information using the lineup optimizer program to generate an optimized lineup of the plurality of players. A drill program uses drill data representing team and playing field images for generating a graphic representation of a drill for output. A graphic user interface is included for processing user commands and activated icons to control the processor and to output outputting the graphic representation and other team information. Using roster information including rating data of the players, the lineup optimizer program processes the rating data to generate the optimized lineup from a plurality of optimizing rules by rating minima for each of a plurality of positions, with the optimized lineup determined from permutations of the players having associated ratings and corresponding positions such that the ratings of players in each position is at least equal to the rating minima. A method is disclosed for organizing a sports team including the steps of storing roster information including player position data and rating data for a plurality of players in a memory; storing optimizing rules; operating a processor using a lineup optimizer program to apply the optimizing rules to the roster information; and generating an optimized lineup of the plurality of players.

23 Claims, 16 Drawing Sheets

| First Name | Goal Keeper | Right Back | Sweeper | Center Back | Left Back | Right Mid Field | Center Mid Field | Left Mid Field | Right Forward | Center Forward | Left Forward |
|---|---|---|---|---|---|---|---|---|---|---|---|
| Alfred | 1 | 2 | 3 | 0 | 1 | 7 | 9 | 5 | 4 | 3 | 3 |
| Ben | 3 | 3 | 5 | 2 | 3 | 4 | 7 | 1 | 4 | 1 | 4 |
| Carl | 3 | 5 | 5 | 3 | 3 | 5 | 6 | 5 | 7 | 7 | 2 |
| Debbie | 3 | 6 | 6 | 5 | 5 | 7 | 7 | 7 | 0 | 5 | 5 |
| Ethan | 6 | 2 | 7 | 7 | 6 | 7 | 7 | 7 | 0 | 2 | 6 |
| Frieda | 7 | 6 | 3 | 4 | 7 | 6 | 8 | 2 | 5 | 0 | 4 |
| Gordon | 8 | 4 | 5 | 4 | 9 | 6 | 8 | 5 | 6 | 7 | 1 |
| Henry | 4 | 1 | 4 | 1 | 2 | 3 | 6 | 4 | 4 | 2 | 2 |
| Irene | 6 | 5 | 5 | 1 | 3 | 1 | 9 | 4 | 6 | 4 | 4 |
| Jean | 3 | 3 | 4 | 6 | 7 | 1 | 6 | 2 | 8 | 2 | 3 |
| Kelly | 6 | 3 | 5 | 4 | 7 | 4 | 2 | 2 | 5 | 4 | 5 |

FIG. 10A

|  | Starting Lineup | Half Time Starting Lineup |
|---|---|---|
| Goal Keeper | Kelly | Gordon |
| Right Back | Frieda | Debbie |
| Center Back | Ethan | [no change] |
| Left Back | Carl | [no change] |
| Center Mid Field | Henry | [no change] |
| Left Mid Field | Irene | [no change] |
| Right Forward | Jean | [no change] |
| Left Forward | Ben | [no change] |

FIG. 10B

|  | Starting Lineup | Half Time Starting Lineup |
|---|---|---|
| Goal Keeper | Kelly | Gordon |
| Right Back | Frieda | Debbie |
| Center Back | Ethan | [no change] |
| Left Back | Gordon | Irene |
| Center Mid Field | Ben | Henry |
| Left Mid Field | Irene | [no change] |
| Right Forward | Jean | Carl |
| Left Forward | Debbie | Ben |

SPORTS TEAM ORGANIZER

BACKGROUND OF THE INVENTION

1. Field of the Invention

This disclosure relates to sports team organizers, and in particular to a computer-based system and method for organizing players and plays of a sports team.

2. Description of the Related Art

The organization of sports teams and plays has become a sophisticated and involved activity, not only for professional sports teams, but also for recreational sports teams as well. Numerical and biographical data are often used to rate or profile players, and large numbers of graphs or drawings are involved in the generation and explanation of drills and plays. The application of computers to process data relating to the players is becoming more prevalent. The information processing capabilities of computer-based team organizers allow a team manager or coach to rapidly access the team's roster information, individual player capabilities, and game histories, such as wins, losses, and scores. Team lineups may be generated based on the individual player's abilities to enhance the overall performance of the team.

In addition, the graphics capabilities of computer-based systems allows team managers to graphically plan drills and plays to implement game strategies.

SUMMARY

A computer-based system is disclosed for organizing a sports team, including an input device, an output device, a memory for storing roster information including player position data and biographical data for a plurality of players, stored programs including a lineup optimizer program, and a processor operating with the stored programs for processing the roster information using the lineup optimizer program to generate an optimized lineup of the plurality of players.

The stored programs include a drill program which uses drill data representing team and playing field images. The processor processes the drill data to generate a graphic representation of a drill for output by the output device. A graphic user interface is included for interfacing user selected commands and activated icons from the input device to the processor, facilitating control of the output device for outputting the graphic representation and other team information.

Using player profile and roster information including rating data of the players which may be stored in the memory, the processor and the lineup optimizer program processes the rating data to generate an optimized lineup from a plurality of optimizing rules, such as using rating minima of the rating data for each of a plurality of positions. In the rating minima case, the processor determines the optimized lineup as a permutation of the plurality of players having associated ratings with each player having a corresponding position such that the associated rating of each player is at least equal to the corresponding rating minimum of the corresponding position.

A method is disclosed for organizing a sports team including the steps of storing roster information including player position data and rating data for a plurality of players in a memory, storing optimizing rules, operating a processor using a lineup optimizer program to apply the optimizing rules to the roster information, and generating an optimized lineup of the plurality of players.

BRIEF DESCRIPTION OF THE DRAWINGS

The features of the disclosed sports team organizer system and method will become more readily apparent and may be better understood by referring to the following detailed description of an illustrative embodiment of the present invention, taken in conjunction with the accompanying drawings, where:

FIG. 9 illustrates an optimizer setup screen;

FIG. 10 illustrates a lineup screen;

FIG. 10A illustrates exemplary player names and corresponding ratings for each position;

FIG. 10B illustrates an exemplary optimized lineup of players in FIG. 10A;

FIG. 10C illustrates an exemplary HIGHER RATINGS lineup of players in FIG. 10A;

FIG. 20 illustrates a game sheet for inputting game information.

DESCRIPTION OF THE PREFERRED EMBODIMENTS

Figure 1:
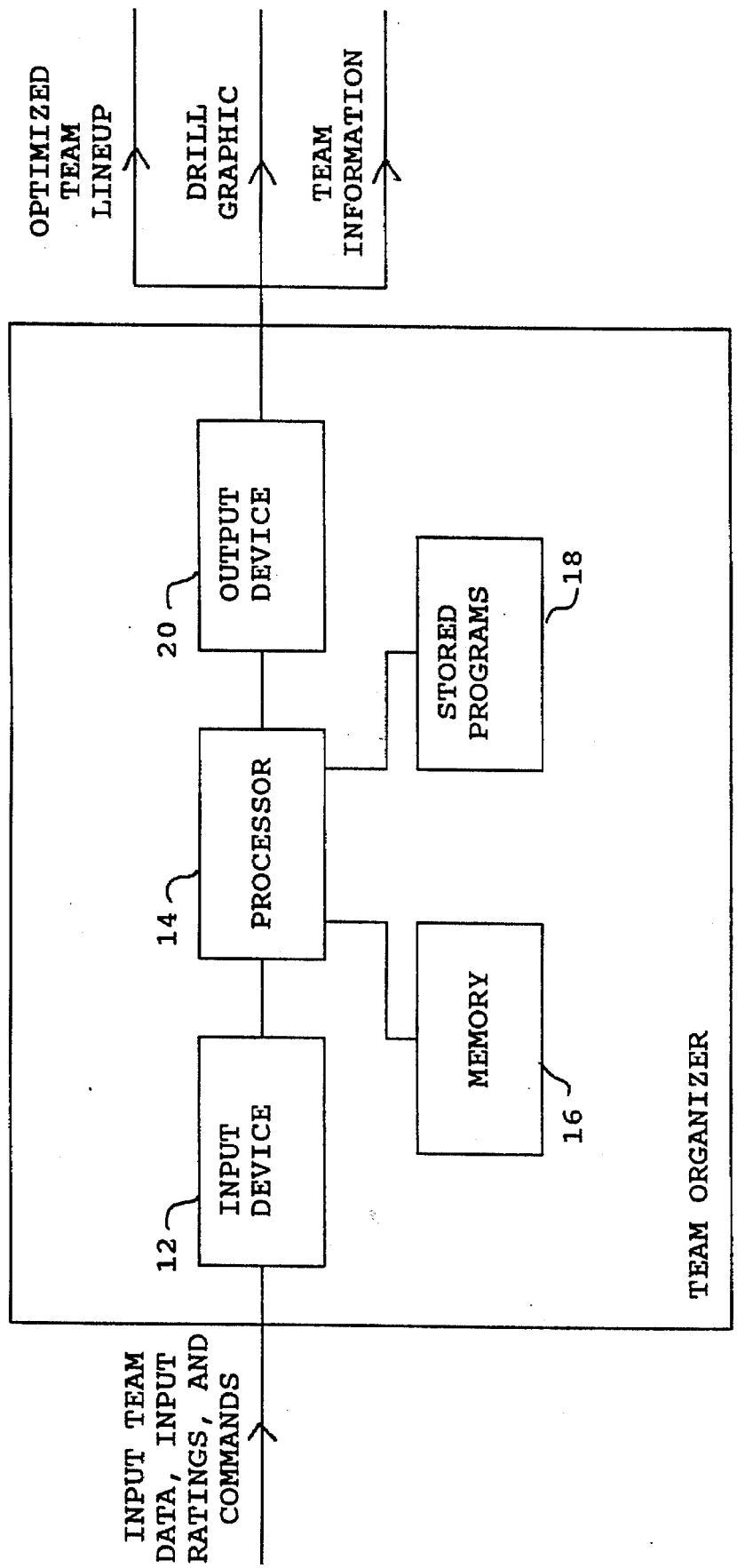
FIG. 1 illustrates a block diagram of the disclosed sports team organizer system.

Referring now in specific detail to the drawings, with like reference numerals identifying similar or identical elements, as shown in FIG. 1, the present disclosure describes a computer-based system 10 for organizing a sports team. An input device 12 receives input team data, input ratings, and user commands. The processor 14 receives and processes the data from the input device 12 to store the input team data as roster information in memory 16 including player position data and biographical data for a plurality of players. Operating with the stored programs 18 including a lineup optimizer program, the processor processes the roster information to generate an optimized lineup of the plurality of players for output by the output device 20.

The stored programs 18 also include a drill program which uses drill data stored in the memory 16 representing team and playing field images to operate with the processor 14 to generate a graphic representation of a drill for output by the output device 20. A graphic user interface of the stored programs 18 is included for processing user selected commands and icons activated from the input device 12 to control the processor 14 and to control the output device 20 for outputting the graphic representation and other team information.

Using roster information including rating data of the plurality of players stored in the memory 16, the processor 14 controlled by the lineup optimizer program processes the rating data to generate the optimized lineup from a plurality of optimizing rules. Using rating minima of the rating data for each of a plurality of positions, the processor determines the optimized lineup as a permutation of the plurality of players having associated ratings with each player having a corresponding position such that the associated rating of each player is at least equal to the corresponding rating minimum of the corresponding position.

The disclosed method for organizing a sports team includes the steps of storing roster information including player position data and rating data for a plurality of players in a memory; storing optimizing rules; operating a processor using a lineup optimizer program to apply the optimizing rules to the roster information; and generating an optimized lineup of the plurality of players.

Figure 2:
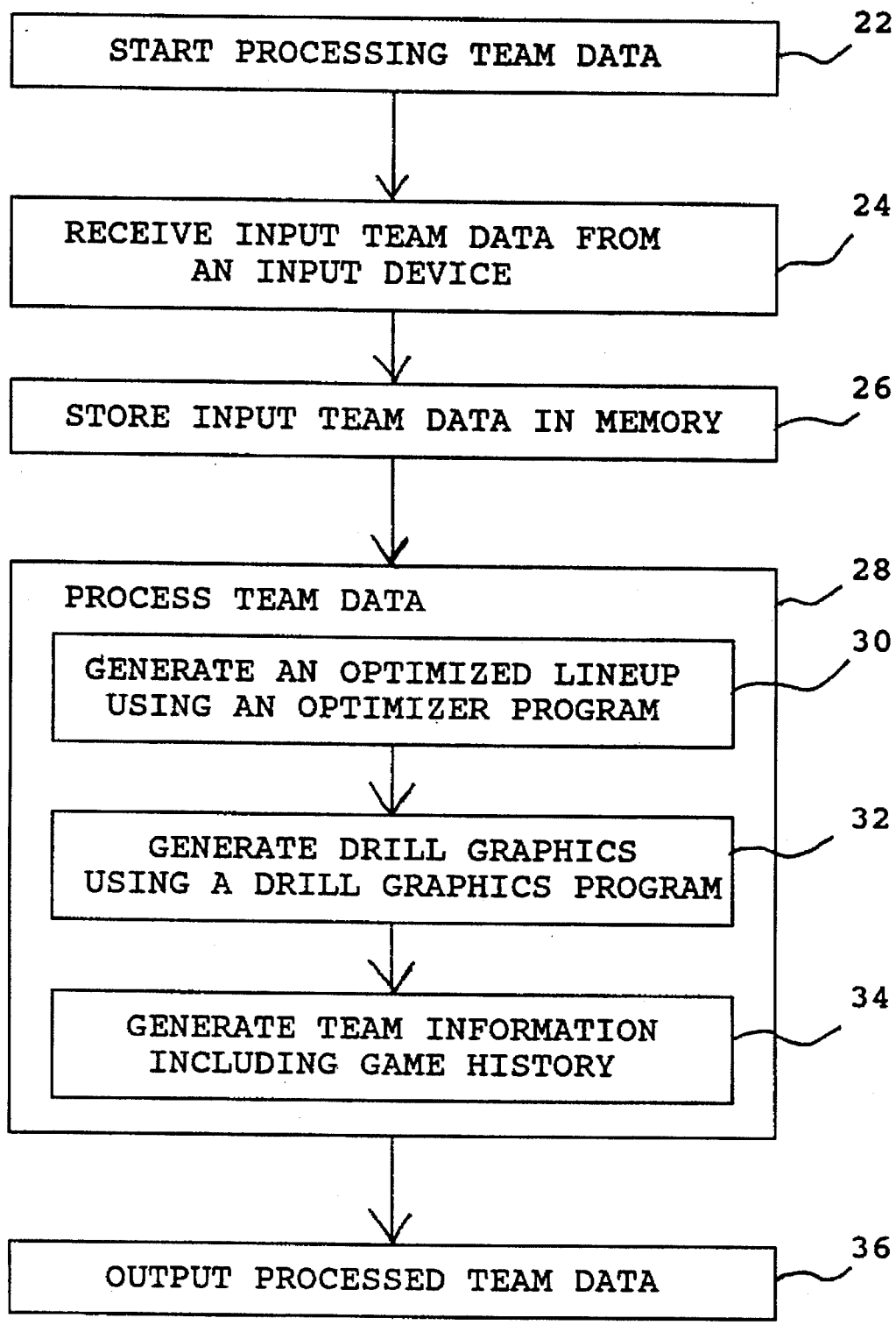
FIG. 2 illustrates a flow chart of the main operating program of the sports team organizer system.

As shown in FIG. 2, the method of operation includes the steps of starting the processing team data in step 22, receiving input team data from the input device 12 in step 24, storing the input team data in the memory 16 in step 26, processing the team data in step 28, and outputting processed team data in step 36. In step 28, the step of processing includes the steps of generating an optimized lineup using a lineup optimizer program in step 30, generating drill graphics using a drill graphics program in step 32, and generating team information including game history in step 32.

Figure 3:
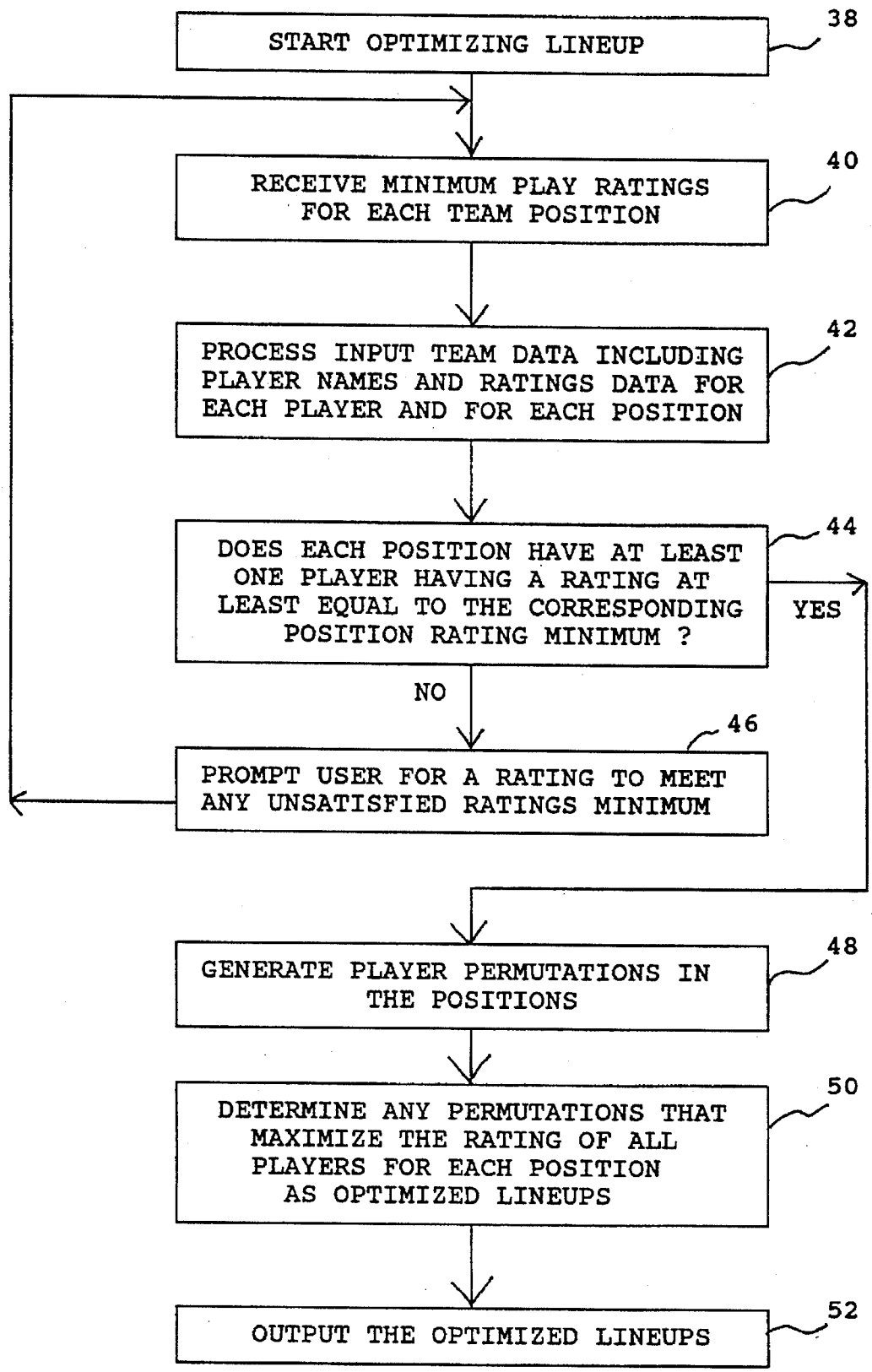
FIG. 3 illustrates a flow chart of a lineup optimizer program.

As shown in FIG. 3, the step of generating an optimized lineup in step 30 of FIG. 2 includes the steps of starting optimized lineup in step 38, receiving minimum play ratings for each team position in step 40, processing input team data including player names and ratings data for each player and for each position in step 42, and checking whether each position has at least one player having a rating at least equal to the corresponding position rating minimum in step 44.

If a position does not have a solution for the current player ratings, the lineup optimizer program prompts the user for a rating to meet any unsatisfied ratings minimum in step 46. However, if each position has at least one solution for the current player ratings, the lineup optimizer program generates player permutations in the positions in step 48, determines any permutations that maximize the rating of all players for each position as optimized lineups in step 50, and outputs the optimized lineups in step 52.

Figure 4:
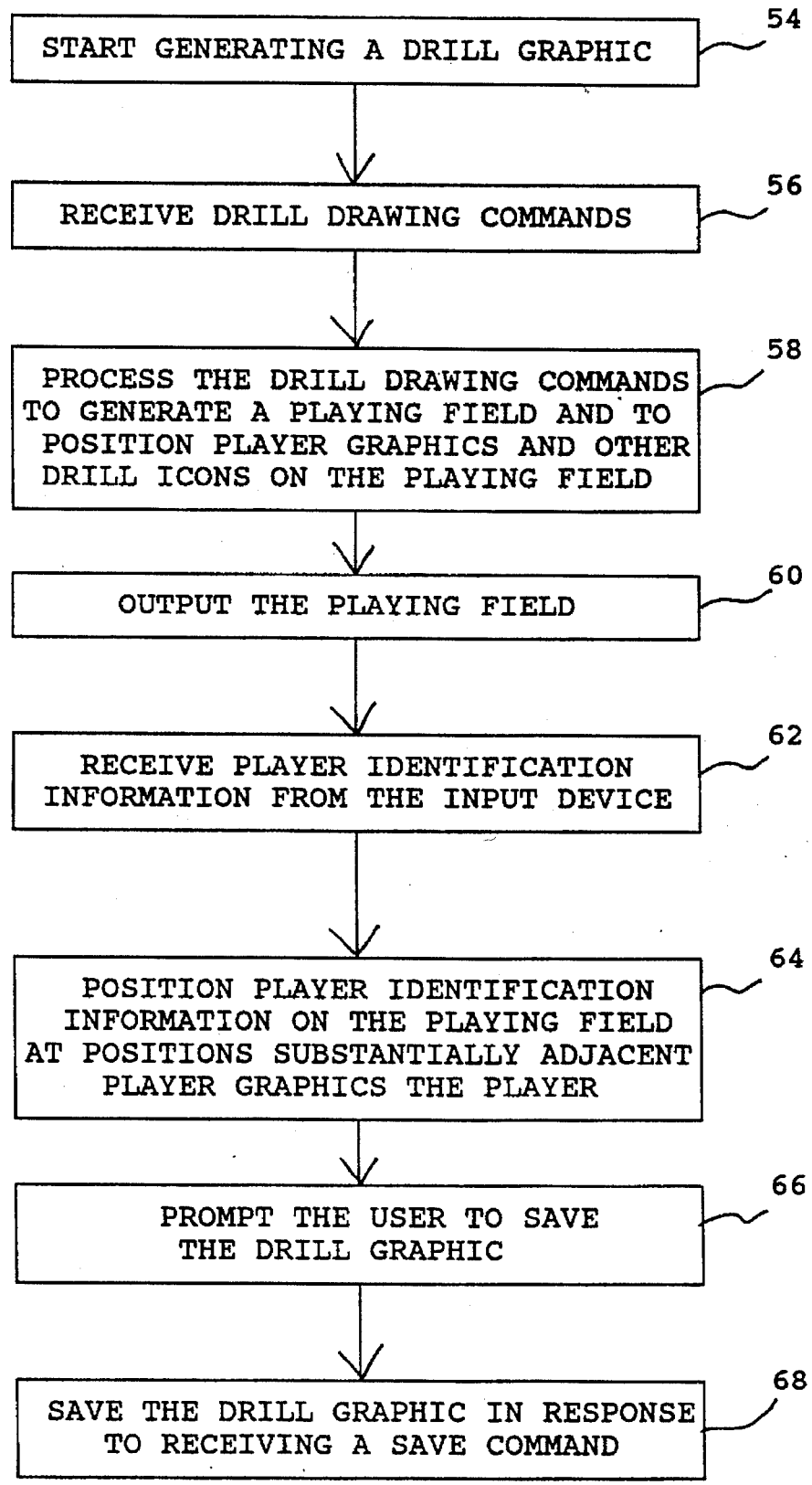
FIG. 4 illustrates a flow chart of a drill generation program.

As shown in FIG. 4 the step of generating drill graphics using a drill graphics program in step 32 of FIG. 2 includes the steps of starting generation of a drill graphic in step 54, receiving drill drawing commands in step 56, processing the drill drawing commands to generate a playing field graphic and to position player graphics and other drill icons on the playing field graphic in step 58, and outputting the playing field graphic in step 60. The drill program may also perform the steps of receiving player identification information from the input device in step 62, and positioning player identification information on the playing field at positions substantially adjacent player graphics associated with the player in step 64. The drill program may also prompt the user to save the drill graphic in step 66, and then save the drill graphic in the memory 16 in response to receiving a save command in step 68.

The sports team organizing system 10 shown in FIG. 1, in conjunction with FIGS. 5–18 described below, and the method of operation shown in FIGS. 2–4 may be implemented in an exemplary embodiment on a personal computer such as an IBM Personal System™ using an INTEL™ 80386 microprocessor or equivalent as the processor 14, with the memory 16 including about 4 megabits (MB) of RAM and a hard disk of about 2 MB. It is understood that other microprocessors having at least the processing capabilities of the INTEL™ 80386 may also be used.

The sports team organizing system and method is implemented in an exemplary embodiment by software including the main operating program, the lineup optimizer program, and the drill program compiled from source code written in the C++ programming language. The compiled programs operate on the MS-DOS™ 6.0 operating system and higher versions available from MICROSOFT™ Corporation, and use a graphic user interface (GUI) such as MICROSOFT™ WINDOWS™ 3.1 for entering data and icon selected commands.

The input device 12 may include a keyboard and a mouse for use in the WINDOWS™ environment, and the input device 12 may also include a data reading device such as a disk drive for importing and receiving player information as well as predetermined drills from storage media such as a floppy disk.

Outputs such as the graphic representation of drills or team lineups are sent to output device 20 such as a display for displaying the graphic representation and team lineups, as well as for use with the graphic user interface; for example, the WINDOWS™ environment. The capability for generating hardcopy printouts of such drills, team lineups, and the like may also be provided. Alternatively, the output device 20 may include specialized graphics programs to convert the generated graphic representation of drills to a displayed graphic and/or to hardcopy plots.

THE MAIN OPERATION PROGRAM

The sports team organizing system 10 is implemented by a main operating program to manage and organize a soccer team in an exemplary embodiment, but the sports team organizing system 10 may also be applied to manage and organize teams in other sports.

Figure 5:
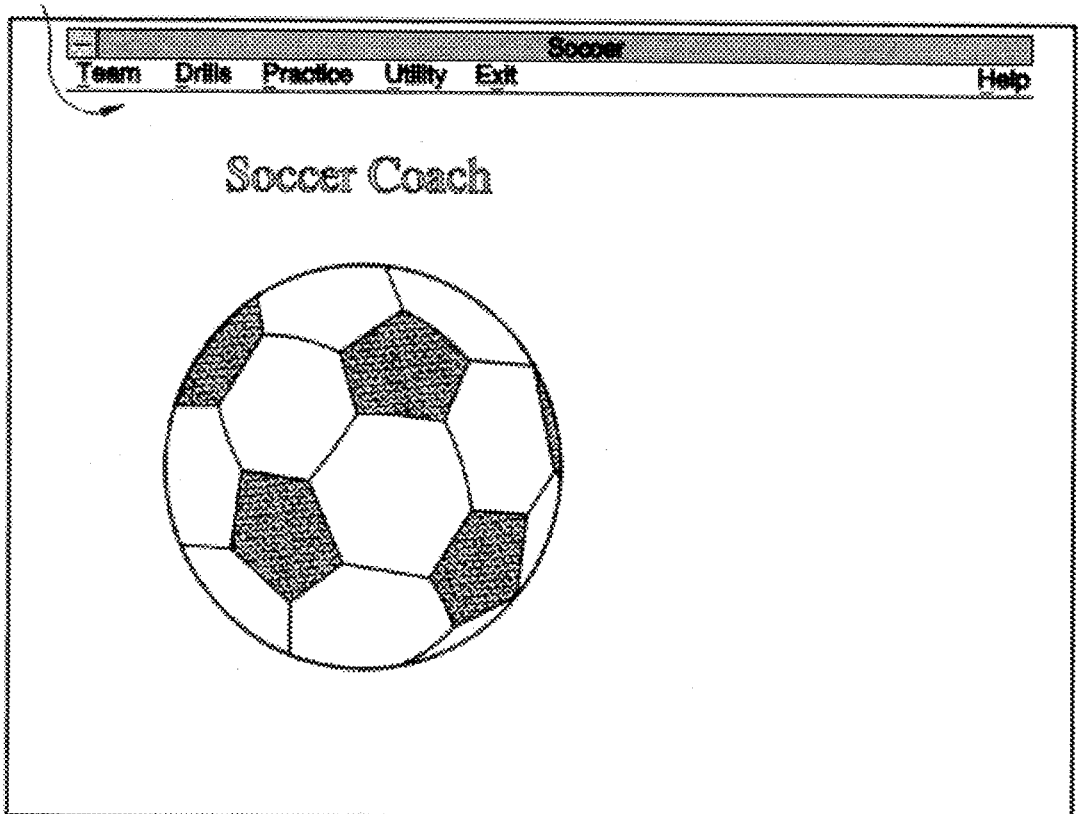
FIG. 5 illustrates a main menu screen.

After the main operating program is installed and stored in the system 10, a main menu screen 70 is illustrated in FIG. 5 having a menu bar 72 allowing the user to select program modules entitled TEAM, DRILLS, PRACTICE, UTILITIES, or to exit from the operating program. By selecting the program modules, the user may access user input windows, pop-up or pull-down menus, and the like.

Figure 6:
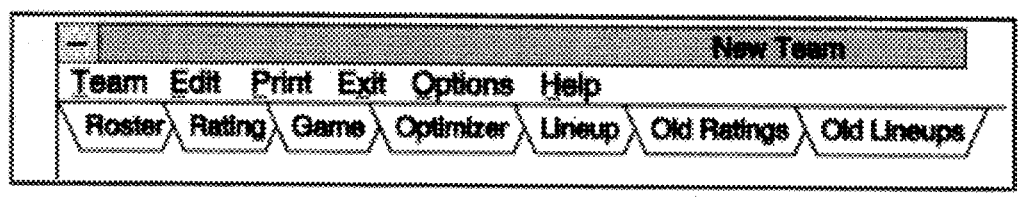
FIG. 6 illustrates a team menu.

By selecting the TEAM module, the operating program generates a team menu 74 or toolbar on a blank screen, as shown in FIG. 6. In an exemplary embodiment, the team menu appears as a plurality of overlapping labeled tab icons for selecting modules entitled ROSTER, RATING, GAME, OPTIMIZER, LINEUP, OLD RATINGS, and OLD LINE-UPS. From the team menu 74, the user may perform administrative functions to manage teams. For example, the user may create and print a roster of players, may rate each player's performance in each position on a field; and may optimize a team's performance by creating game line-ups based on players' ratings. The user may also keep track of each team's game times and locations, all wins and losses, and any user commentary on plays and strategies.

GENERATING A TEAM ROSTER

Figure 7:
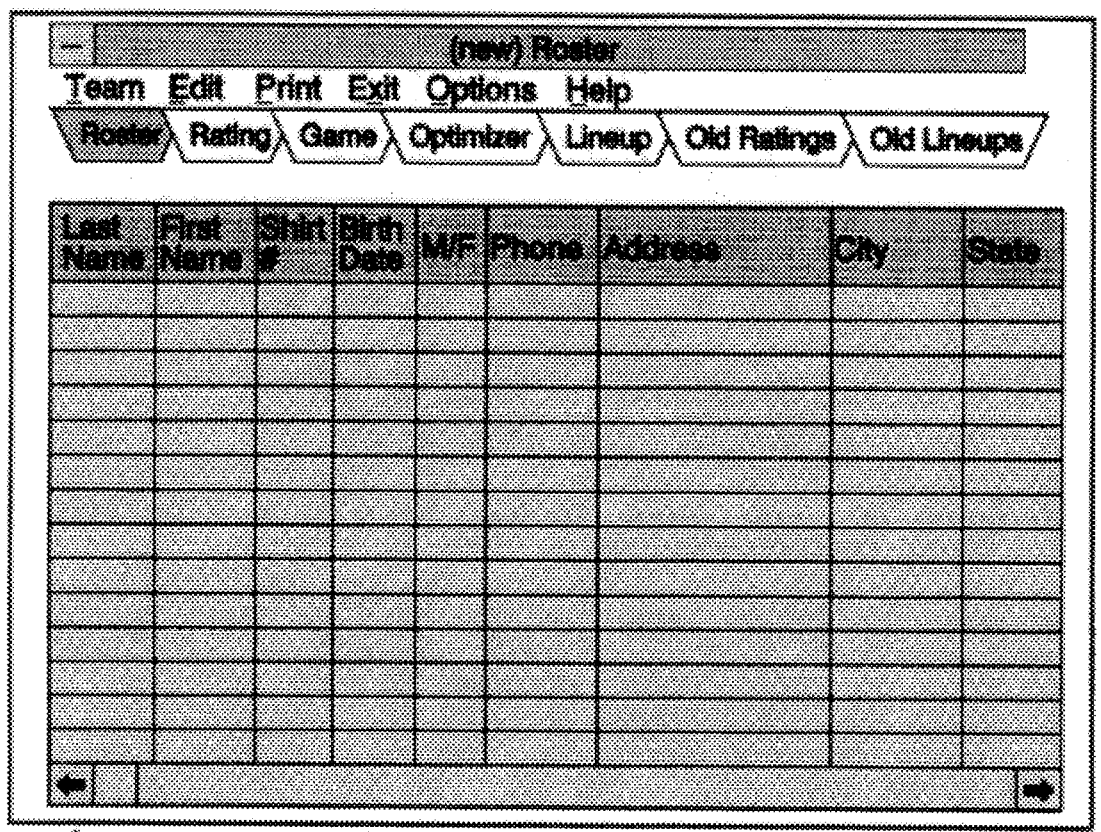
FIG. 7 illustrates a roster input screen.

By selecting the ROSTER module, the user instructs the operating program to generate a new datafile for the team. The operating program displays a roster input screen 76 as shown in FIG. 7. In the exemplary embodiment, the roster input screen 76 appears as a spreadsheet having an array of fields of which a portion is shown at any given time. In the exemplary embodiment, the roster datafile allows the user to input up to 256 players names, with corresponding biographical information such as addresses, birth dates, phone numbers, player numbers such as shirt numbers, etc.

From the roster input screen 76, the user may add new player information or may edit or delete existing player information by selecting the EDIT module from the roster input screen 76 and by selecting the fields to input changes through the input device 12. The user may also sort the roster according to player last names, first names, shirt numbers, etc. by selecting a SORT command from the OPTIONS module from the roster input screen 76. Other commands such as saving the roster, printing the roster, and opening and closing currently displayed rosters.

GENERATION AND OPTIMIZATION OF LINEUPS

Figure 8:
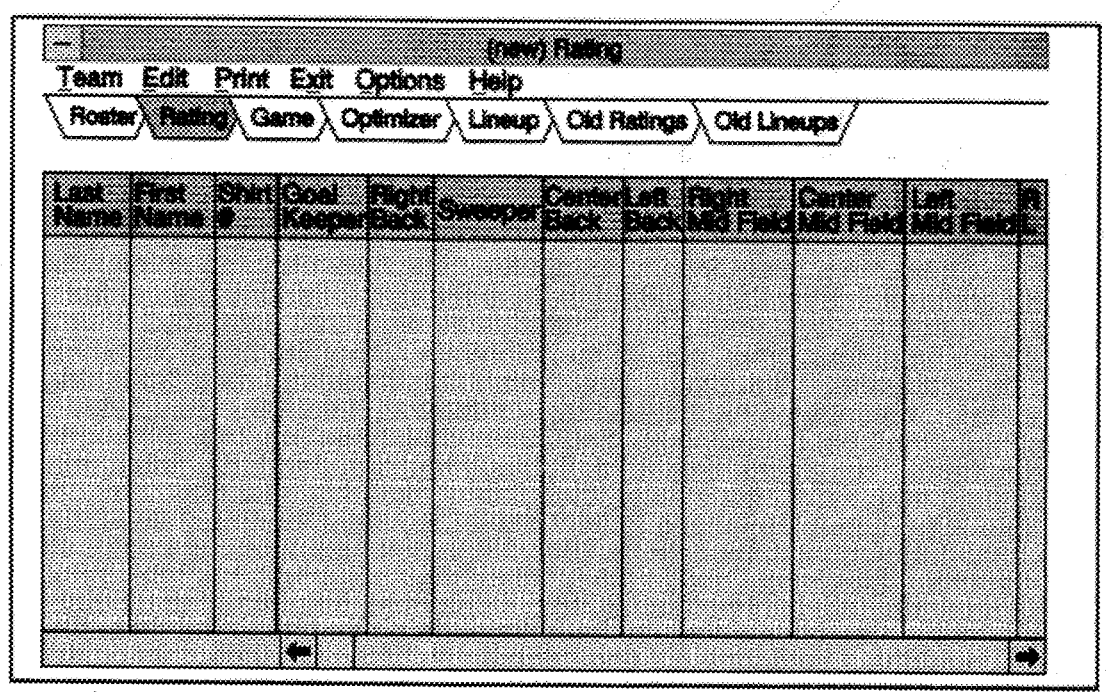
FIG. 8 illustrates a rating screen.

After opening and displaying a roster, the user may then open a rating screen using the RATINGS module to rate each player on their performance in each position on the playing field, as well as to rate on each player's overall stamina. In an exemplary embodiment, as shown in FIG. 8, the operating program generates a rating screen 78 which overlaps the currently open roster screen 76 for user input of ratings of each player in each position and which may extend beyond the displayed screen. In the exemplary embodiment, the ratings range from a minimum of 0 for worst or weakest or for no performance rating, to a maximum of 10 for best or strongest performance. Such ratings may then be saved or printed, and may be retrieved at a later date using the OLD RATINGS module.

Figure 9:
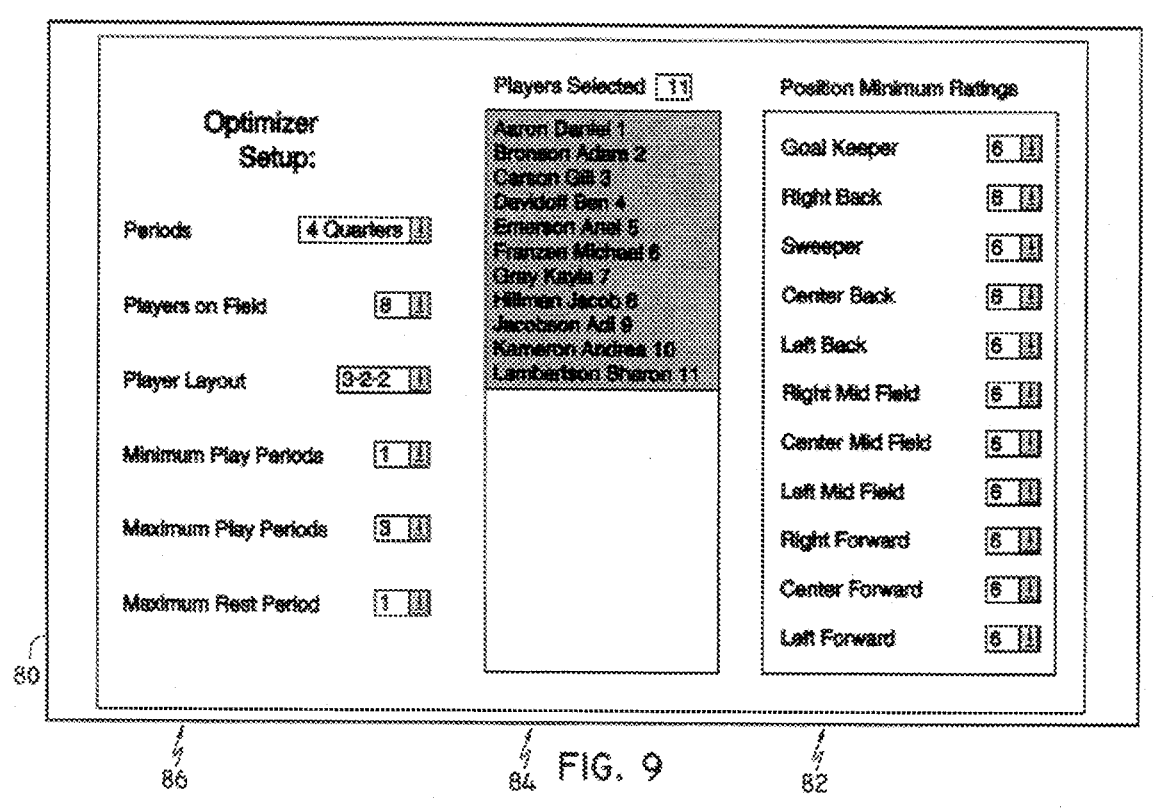

To generate a lineup, the user selects the OPTIMIZER module, which instructs the operating program to generate an optimizer setup screen 80, shown in FIG. 9, including a minimum ratings region 82 for inputting minimum ratings required for each position, a selected players region 84 for selecting the players for a lineup, and a lineup play region 86 for inputting play times and other play information such as rest periods and number of players to be on the field at any given time. For example, from the lineup play region, the user may specify the number of periods such as 4 quarters, 2 halves, or 6 periods; the number of players based on the team size for the type of game played; and the minimum and maximum play periods per player and the maximum rest period per player ranging from 1 to 4.

After entering the data to the optimizer setup screen 80, the user then generates a lineup for the players selected in the selected players region 84 by entering a LINEUP command to enter a lineup mode which allows the user to perform other lineup functions.

Figure 10:
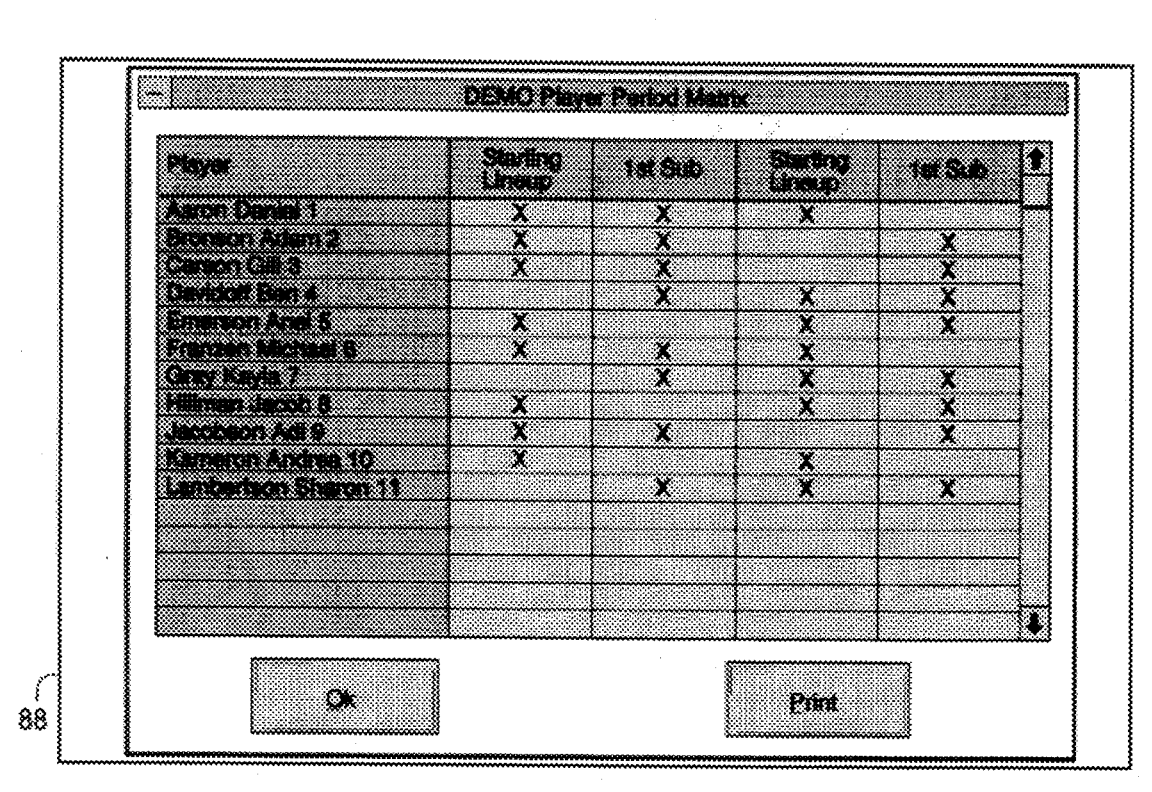

In lineup mode, the operating program generates a lineup screen 88 as shown in FIG. 10 which displays a player/position matrix with entries for each player for each play period. For example, the user may have two players per position for each half of a game; i.e. one player to start and one to substitute. The user may then enter a proposed lineup manually or may have the lineup optimizer program generate an optimized lineup automatically. These lineups may then be saved or archived by the ARCHIVE function selected from a pull-down menu accessed by the SPECIAL icon through the OPTIONS module. Such archived lineups may be identified by name and/or by date of creation, and may be accessed at a later date using the OLD LINEUP module.

After manual lineup entry, the user may check the lineup against the minimum ratings entered in the optimizer setup screen 90 by selecting a CHECK command from the OPTIONS module. The lineup optimizer program checks whether the proposed lineup meets the minimum ratings for each position using optimizing rules, such as rules for comparing the player's rating with the minimum rating for each position. If there is an inconsistency in the proposed lineup versus the minimum ratings specified, the lineup optimizer program highlights the inconsistent positions and generates and displays an error message. In response, the user may ignore the inconsistency and continue the checking procedure, or the user may also assign a different player to the position and then continue the checking procedure.

For automatic optimizing, the user selects the OPTIMIZE command in the OPTIMIZE module for a permutation of players as a lineup meeting the minimum ratings and the minimums and maximums play periods as the optimizing rules. Such a lineup may be used for practice games or for competitive games. However, the user may prefer to optimize the overall team performance in competitive games, so the user may then select a HIGHER RATINGS command in the OPTIMIZE module which assigns players with the highest ratings for as many positions as possible.

For example, players A and B may be assigned ratings of 6 and 10, respectively, for the goal keeper position. For a minimum rating of 6 for the goal keeper position, the lineup optimizer program performing the OPTIMIZE command generates a first lineup with player A as the goal keeper, and a second alternative lineup with player B as the goal keeper. However, the HIGHER RATINGS command would generate one lineup with player B as the goal keeper as player B has the higher rating and thus the optimal rating under the optimizing rules for the goal keeper position.

FIG. 10A illustrates exemplary player names and corresponding ratings for each position. In this example, the user may specify in the lineup play region 86 in the optimizer screen 80 that the number of periods is 2 halves; the number of players on the field is 8; the player layout is 3-2-2; the minimum play periods is 1; the maximum play periods is 2; and the maximum rest periods is 2. In addition, in the position minimum ratings region 82, the team positions and minimum ratings are as follows:

| POSITION | MINIMUM RATING |
| --- | --- |
| Goal Keeper | 6 |
| Right Back | 6 |
| Sweeper | 7 |
| Center Back | 5 |
| Left Back | 1 |
| Right Mid Field | 6 |
| Center Mid Field | 2 |
| Left Mid Field | 0 |
| Right Forward | 1 |
| Center Forward | 5 |
| Left Forward | 3 |

In this example, ten players are selected by highlighting all of the players names in the selected player region 84 except Alfred, from which the optimizer program generates optimized lineups.

FIG. 10B illustrates an exemplary optimized lineup of players in FIG. 10A generated by the automatic lineup optimization function, with the permutation of Kelly as the Goal Keeper, Frieda as the Right Back, Ethan as the Center Back, Carl as the Left Back, etc. in the starting lineup in the first half. This permutation of players meets the ratings minima for each team position in the 3-2-2 player layout as well as the other constraints in the lineup play region 86. As shown in FIG. 10B, the permutation of players as the starting lineup in the second half is Gordon as the Goal Keeper, Debbie as the Right Back, Ethan remaining as the Center Back as indicated by the label "[no change]", Carl remaining as Left Back, etc.

FIG. 10C illustrates an exemplary HIGHER RATINGS lineup of players in FIG. 10A generated by the automatic lineup optimization function, with the permutation of Kelly as the player with the highest rating to be Goal Keeper, Frieda as the player with the highest rating to be Right Back, Ethan as the player with the highest rating to be Center Back, Gordon as the player with the highest rating to be Left Back, etc. in the starting lineup in the first half. This permutation of selected players not only meets the ratings minima for each team position in the 3-2-2 player layout, but also determines the players with the highest rating available for each team position. As shown in FIG. 10B, the starting lineup in the second half is Gordon as the player with the highest rating to be Goal Keeper, Debbie as the player with the highest rating to be Right Back, Ethan remaining as the player with the highest rating to be Center Back as indicated by the label "[no change]", but with Irene as the player with the highest rating to be Left Back, instead of Carl as in the optimized lineup in the second half as shown in FIG. 10B.

GENERATION OF DRILLS

The sports team organizing system 10 also includes a drill program to generate drills; i.e. graphics diagrams of a play or a series of plays for use in training a team or planning a strategy. In the exemplary embodiment for a soccer team, the drill program provides 40 predetermined soccer drills designed and tested from experience. Such predetermined drills may be modified to fit a team's profile.

Figure 11:
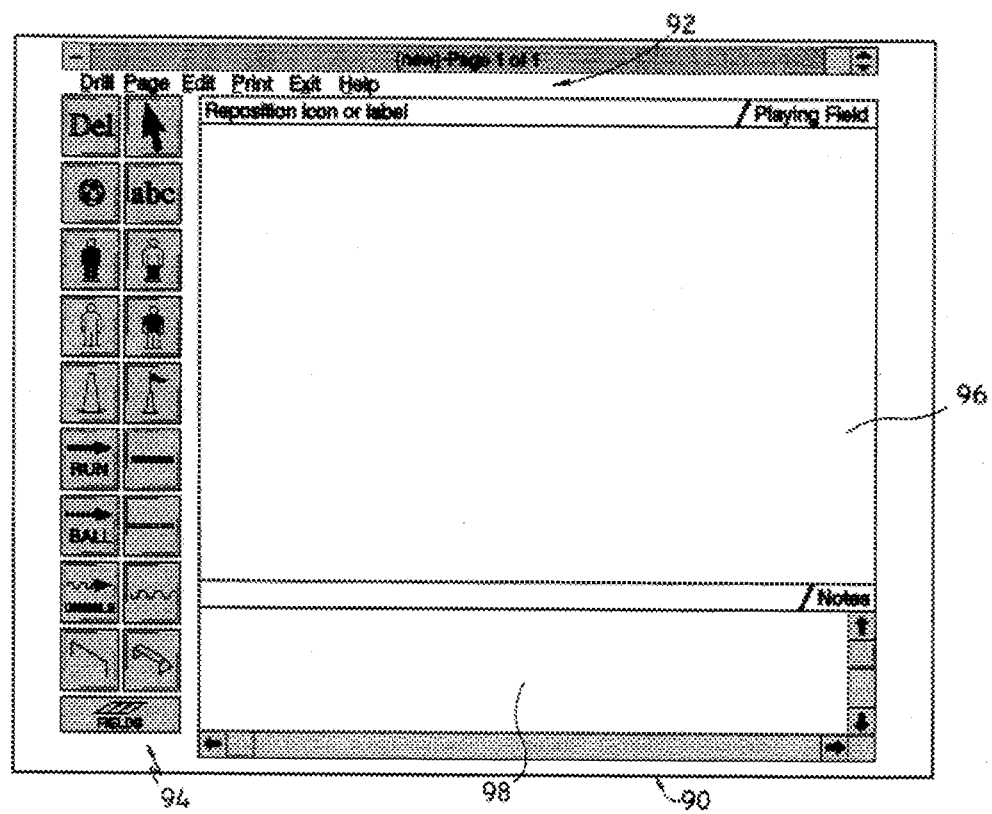
FIG. 11 illustrates a drill construction screen.

The drill program may also generate customized drills using a drill construction screen 90 shown in FIG. 11 having a toolbar 92, a plurality of drawing command icons 94, a drill graphic construction region 96, and a notes region 98 for inputting a title and/or commentaries about the drill.

Figure 12:
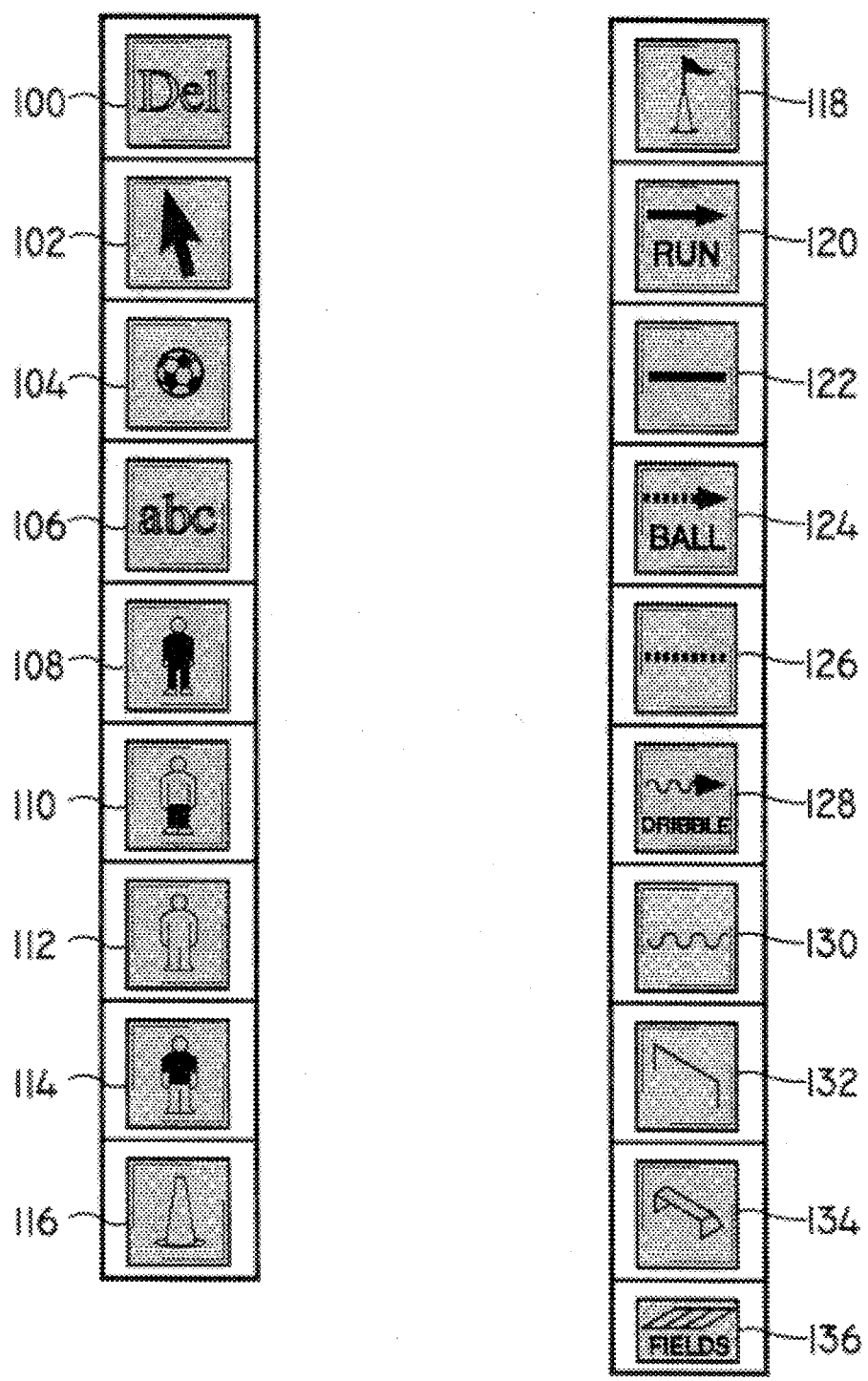
FIG. 12 illustrates example drawing command icons.

The following drawing command icons 94 are shown in greater detail in FIG. 12:

DELETE icon 100 for deleting a currently displayed icon or label;

POINT icon 102 for repositioning a selected icon or label;

BALL icon 104 for placing a ball;

LABEL icon 106 for placing or editing a label, such as player information; i.e. player names positioned near a player icon;

PLAYER icon 108 for placing a black suited player;

PLAYER icon 110 for placing a white topped player;

PLAYER icon 112 for placing a white suited player;

PLAYER icon 114 for placing a black topped player;

CONE icon 116 for placing a cone;

FLAG icon 118 for placing a flag;

RUN ARROW icon 120 for placing a run path arrow;

RUN PATH icon 122 for placing a run path;

BALL ARROW icon 124 for placing a ball path arrow;

BALL PATH icon 126 for placing a ball path;

DRIBBLE ARROW icon 128 for placing a dribble path arrow for generating basketball team drills;

DRIBBLE PATH icon 130 for placing a dribble path for basketball team drills;

GOAL icon 132 for placing an upright goal;

GOAL icon 134 for placing a three dimensional goal; and

FIELDS icon 136 for selecting a playing field.

The drills may be created by selecting the appropriate icons using the mouse, by dragging the selected icons to user-specified locations on the drill construction region 96, and by releasing the dragged icons to place the icons at these locations. It is recommended that the drills be created in the following order:

1) select the playing field layout using the FIELDS icon 136;

2) select and place the goal style from either of the GOAL icons 132, 134;

3) select and place cones 116 and flags 118;

4) select and place players from the player icons 108–114;

5) place labels using the label icon 106, and edit, move or delete the labels using the point icon 102 and the delete icon 100;

6) select and place run paths and arrows using run icon 120, 122;

7) place the ball on the field using the ball icon 104; and 8) place ball and dribble paths and arrows using icons 124–130.

In particular, as shown in FIGS. 13–18, once the goal icons, player icons, and run, ball, and dribble path icons are positioned on the drill graphic construction region 96, pressing or clicking the left mouse button rotates the selected icon to any one of the indicated rotations. Each click of the left mouse button rotates the icon another turn.

Figure 19:
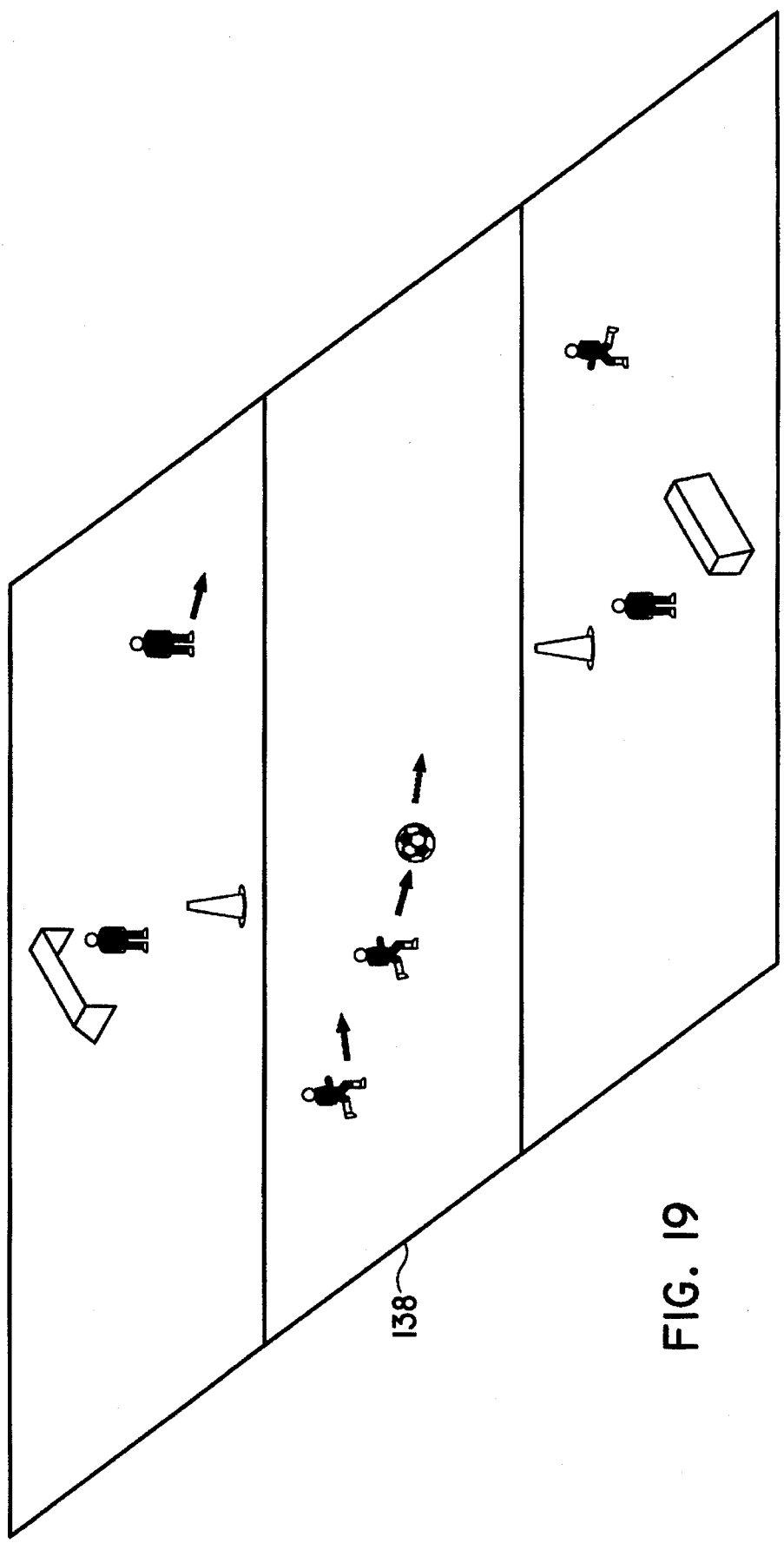
FIG. 19 illustrates an exemplary drill graphic generated by the drill program.

FIG. 19 illustrates an exemplary drill graphic 138 generated by the drill program in which a field has been selected and player icons, cones, and arrows are positioned on the field, modified, printed, and saved using the procedures disclosed hereafter.

A) Selecting A Playing Field Layout

To select a playing field, the user:

1. clicks once on the FIELDS icon 136; and 2. selects one of a variety of fields displayed on a fields layout screen, such as a soccer field, a basketball field, a baseball field, etc.

B) Selecting Goal Style And Placing Goals

The system 10 offers the user with the choice of upright goals or three dimensional (3-D) goals. To select a goal, the user:

1. selects the upright goal 132 icon or the 3-D goal icon 134 to place the selected icon on the field;

2. points to a position on the field where the user wants to place the goal; and 3. clicks once on the mouse button.

C) Rotating Goals

Figure 13:
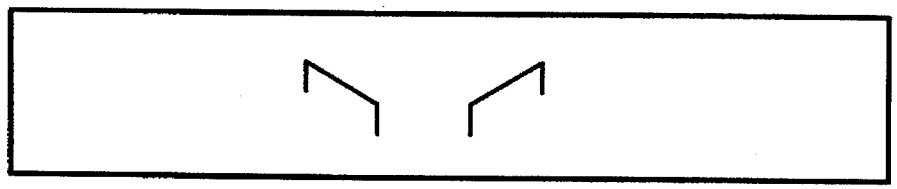
FIGS. 13–18 illustrate rotated orientations of drawing command icons.
Figure 14:
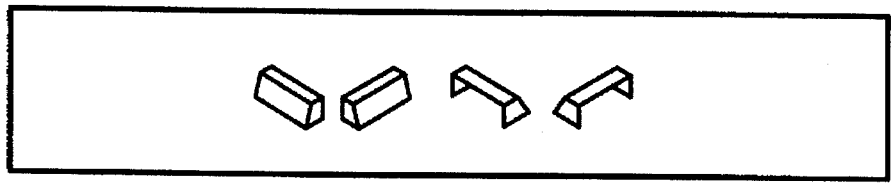

As illustrated in FIG. 13, upright goals may be rotated to the two positions or orientations shown, while 3-D goals may be rotated to four positions as illustrated in FIG. 14.

To rotate the selected goals positioned on a field, the user:

1. clicks once on the goal using the cursor and mouse to rotate one turn; and 2. clicks again to rotate another turn.

Each successive click rotates the goal another turn.

D) Placing Cones and Flags

To place cones and flags, the user:

1. selects the cone icon 116 or the flag icon 118;

2. points to a position on the field where the user wants to place the selected cone or flag; and 3. clicks once on the mouse button.

E) Placing Players

The system 10 allows the user to select four different player uniforms: black suit, white top, white suit and black top. To select a player, the user:

1. selects a player icon of the user's choice of player icons 108–114;

2. points to a position on the field where the user wants to place the player; and 3. clicks the mouse button once.

F) Rotating Players

Figure 15:

Player on the field may be rotated to three positions or orientations as shown in FIG. 15. To rotate the players, the user:

1. clicks on a player once to rotate one turn; and 2. clicks again to rotate another turn.

Each successive click rotates the player another turn.

G) Placing Player Labels Automatically

If the user wants to label players automatically as they are placed on the field, the user activates an AUTO LABEL function, where the user:

1. clicks on the AUTO LABEL icon in the EDIT menu; and 2. causes a check mark to appear next to the AUTO LABEL icon, indicating that the AUTO LABEL function is activated. To deactivate AUTO LABEL, the user clicks again to remove the check mark.

H) Placing Player Labels Manually

If AUTO LABEL is not activated when the user places the players, the user may place labels manually, where the user:

1. selects the label icon 106 to go into label mode;

2. points to a position on the field where the user wants to place the label;

3. clicks once to place the cursor at the position; and 4. types in label information.

I) Editing Labels

If AUTO LABEL is activated when the user placed players on the field, each player is placed with a label. To edit these labels, the user:

1. selects the label icon 106 to go into label mode;

2. clicks once on the label to be edited to place a cursor;

3. drags the cursor over the existing label; and 4. types in new label information.

J) Placing Run Path Arrows and Run Paths

Once the user has positioned players on the playing field, the user may use run paths to indicate in which direction the player is moving, where the user:

1. selects either the run path arrow icon or run path icon 122;

2. points to a position on the field where the user wants to place the run path arrow or run path; and 3. clicks once.

Figure 16:
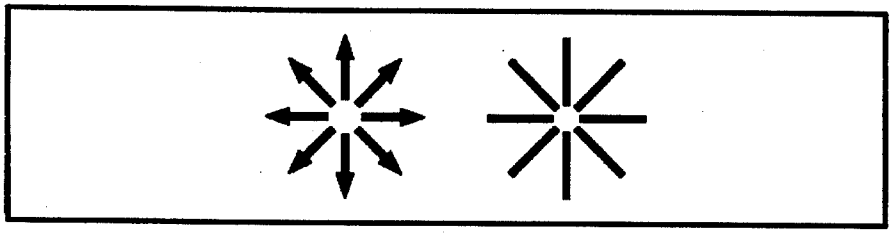

Run path arrows and run paths may be rotated to eight positions or orientations as shown in FIG. 16, where the user:

1. clicks on run the path arrow or run path once to rotate one turn; and 2. clicks again to rotate another turn.

Each successive click will rotate the arrow or path another turn.

K. Placing Balls

The user may place as many balls as desired in play on the field at the same time. To place balls, the user:

1. selects the ball icon 104;

2. points to a position on the field where the user wants to place the ball; and 3. clicks once.

Figure 17:
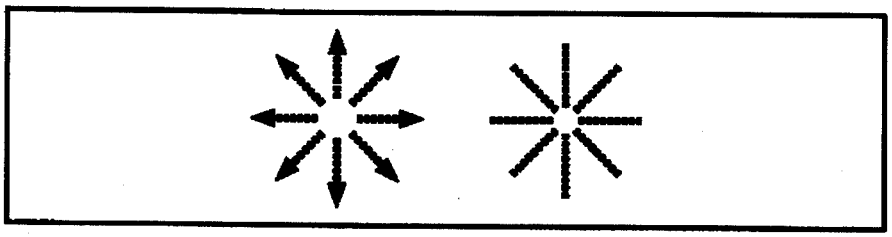

Ball path arrows and ball paths may be rotated to eight positions or orientations as shown in FIG. 17. To rotate, the user:

1. clicks on a ball path arrow or ball path once to rotate one turn; and 2. clicks again to rotate another turn.

Each successive click rotates the ball arrow or path another turn.

L. Placing Dribble Paths And Arrows

Dribble path arrow and dribble path indicate in which direction the ball is moving. To place the dribble paths and arrows, the user:

1. selects a dribble path arrow icon or dribble path icon;

2. points to a position on the field where the user wants to place the dribble path arrow or dribble path; and 3. clicks once.

Figure 18:
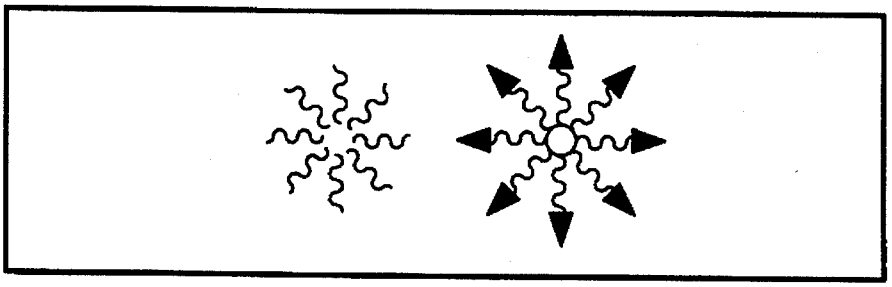

Dribble path arrows and dribble paths may be rotated to eight positions or orientations as shown in FIG. 18. To rotate, the user:

1. clicks on dribble path arrow or dribble path once to rotate one turn; and 2. clicks again to rotate another turn.

Each successive click rotates the arrow or path another turn.

M. Deleting Items From The Playing Field

The user may remove items from the field by using delete mode, where the user:

1. selects the DEL icon 100;

2. points to the item which the user wants to delete; and 3. clicks once.

N. Entering Drill Notes

The user may make notes about the constructed drill in the notes annotation area or region 98 from any mode on the Toolbar. The user:

1. positions the cursor on notes area or region 98;

2. clicks once to place cursor; and 3. types in information.

O. Creating/Viewing Multiple Pages Of A Drill

Drills may have multiple pages. To insert a page, the user selects INSERT from the page menu. To delete a page, the user:

1. selects the DEL function on the page menu, which causes the system 10 to prompt the user to continue with delete; and 2. clicks on an OK icon.

If the user does not want to continue with the delete function, the user then:

3. clicks on a CANCEL icon.

To navigate between pages, the user selects NEXT PAGE or PREVIOUS PAGE from Page menu.

P) Saving A New Drill

To save a new drill, the user:

1. clicks on SAVE in the Drill menu, which causes the system 10 to prompt the user to assign a name and category to your drill; and then 2. clicks on an OK icon.

Q) Modifying An Existing Drill

The user may modify existing drills by:

adding or deleting items on the field;

repositioning items on the field; and/or changing the name or category of the drill.

To add or delete items, the above disclosure under Creating a New Drill provides the procedure to be performed by the user. Repositioning items on the field is disclosed below.

To change the name or category of the drill, the user:

1. selects CATEGORY from the Edit menu;

2. click once to place the cursor in either the name field or the category field; and 3. types in the new information.

R) Opening An Existing Drill

To open an existing drill, the user:

1. clicks on OPEN from the Drill menu;

2. selects a drill; and 3. clicks once on OPEN.

S) Changing the Field Layout

There are two ways to change the field layout. First, the user may use the FIELDS icon 136, where the user:

1. clicks on the FIELDS icon 136; and 2. selects a field layout.

Second, the user may use the Edit pull-down menu, where the user:

1. selects FIELD from the Edit menu; and 2. selects a field layout.

If the user has opened the field layout selection screen and wants to leave it without making a new selection, the user clicks on a box at upper left of the screen and selects CLOSE.

T) Repositioning Items On The Field

The user may use the POINT icon 102 to enter a point mode to move players, labels, balls, goals, cones, flags, and paths to different positions on the field, where the user:

1. clicks on the POINT icon 102;

2. positions the arrow on the item to be repositioned;

3. holds the mouse button down; and 4. drags icon to its new position.

If the input device 12 includes a two-button mouse, the user may use the right-hand button to affect the following items:

flags and cones toggle back and forth;

players toggle amount the four uniform choices; and goals enlarge 50%.

U) Rotating Items

Players, paths and goals are rotatable. To rotate an item, the user:

1. selects the mode on the Toolbar that corresponds with the item to be rotated;

2. points to the item on the screen;

3. clicks once for one rotation; and 4. click again for another rotation.

Each successive click rotates the item one rotation.

V) Using Auto Rotate

Auto Rotate allows the user to rotate any item on the field from any mode. If Auto Rotate is not activated, the user is to enter the mode of the object to be rotated: To activate Auto Rotate, the user clicks on Auto Rotate in the Edit menu.

A check mark then appears next to Auto Rotate, indicating that Auto Rotate is activated. To deactivate Auto Rotate, click again to remove the check mark.

W) Saving A Modified Drill

The user may modify any drill and may save it with the same name, where the user clicks on SAVE in the Drill Menu. If the user modifies one of the predetermined stored drills, the user is to save it with a new name, where the user:

1. selects "SAVE AS . . . " from the Drill menu;

2. assigns a name and category to the drill to be saved; and 3. clicks on the OK icon.

The predetermined stored drills provided by the system 10 may be modified, but revert to their original form when the user closes the drill procedure. The user is to save a modified predetermined drill with a new name or the user will lose any modifications.

X) Printing a Drill

To print a drill, the user:

1. selects PRINT from the Print menu;

2. selects ALL to print all pages of a roster, or selects SELECTION or RANGE to print only some of the pages of a roster;

3. selects SETUP to change the size, source, or orientation of your paper, or to change printers. It is recommended that rosters are to be printed with paper in landscape orientation, in order to fit all or as much of the drill onto the page;

4. clicks on an OK icon.

Y) Closing A Drill

To close your drill, the user selects CLOSE from the Drill menu.

Z) Exiting the drill module

To exit the Drill module, the user clicks once on the EXIT icon, which returns the user to the system main menu screen shown in FIG. 5.

PRACTICE

The system 10 allows the user to design a practice session using both our drills and custom designed drills. In the Practice module, the user selects and reviews drills and incorporates them into a practice session. The user may then print the drills.

A) Designing A Practice Session

To design a practice session, the user:

1. clicks on PRACTICE;

2. selects NEW; and 3. clicks on OPEN, which causes the system 10 to generate and display a practice opening screen with information and suggestions about each period of the practice; and 4. clicks on an OK icon.

A new practice sheet is then opened.

B) Inserting A Drill

To insert a drill, the user:

1. clicks once on the dotted line within one of the windows to select an insert position;

2. clicks once on INSERT;

3. selects a drill;

4. uses the pull-down menu to specify the page number;

5. clicks once on VIEW if the user wants to view the drill at this point;

6. closes the drill view by clicking twice on the upper left-hand bar; and 7. adds the drill to a practice session by clicking once on SELECT.

C) Deleting A Drill

To delete a drill from the practice session, the user:

1. clicks once on the drill; and 2. clicks on DELETE, which causes the system 10 to prompt the user to accept or cancel your decision to delete;

3. clicks on an OK icon to continue the deleting procedure; and 4. clicks on CANCEL to cancel the deleting procedure.

D) Checking A Practice Session

The Check feature verifies that the user has selected drills and page numbers that still exist. The user accesses the Check feature by selecting CHECK from the Option menu. The user receives an error message if the user has selected a drill or page number that has been deleted.

E) Saving A Practice Session

To save a new practice session, the user clicks on SAVE in the Practice pull-down menu. The user is prompted to assign a name to the practice session.

To save an existing practice session with a new name, the user clicks on "SAVE AS . . . " from the Practice pull-down menu. The user is prompted to assign a new name to your practice session.

F) Printing A Practice Session

To print a practice session, the user clicks once on PRINT. Each drill is previewed on the screen as it is printing.

G) Closing Your Practice Session

To close a practice session, the user selects CLOSE from the Practice pull-down menu.

H) Exiting The Practice Module

To exit the Practice module, the user clicks one on EXIT, which returns the user to the main menu screen 70.

UTILITY

The Utility module of the system 10 allows the user to import team information, drills, or practice sessions from a floppy disk, as well as to delete teams, drills or practice sessions.

A) Importing New Teams, Drills, Or Practices

To import team information, the user:

1. selects Import Team Data from the Utility menu;
2. selects the drive from which the user is to be importing.
3. selects the team or teams that the user wants to import; and
4. clicks on IMPORT To import drills, the user:

1. select Import Drill Data from the Utility menu;
2. select the drive from which the user is to be importing;
3. select the drill or drills that the user wants to import; and
4. click on Import.

To import practice information, the user:

1. selects Import Practice Data from the Utility menu;
2. selects the drive from which the user is to be importing;
3. selects the practice session or sessions the user wants to import;
4. clicks on IMPORT.

B) Deleting Teams, Drills Or Practices

To delete team information, the user:

1. selects Delete Team Data from the Utility menu;
2. selects the team which the user wants to delete;
3. clicks on DELETE, which causes the system 10 to prompt the user to accept or cancel the decision to delete;
4. clicks an OK icon to continue the delete procedure; and
5. clicks a CANCEL icon to cancel the delete procedure.

To delete drills, the user:

1. select Delete Drill Data from the Utility menu;
2. selects the drill which the user wants to delete.
3. clicks on Delete, which causes the system 10 to prompt the user to accept or cancel the user's decision to delete;
4. click on an OK icon to continue the delete procedure; and
5. click on a CANCEL icon to cancel the delete procedure.

To delete practice sessions, the user:

1. selects Delete Practice Data from the Utility menu;
2. selects the practice session which the user wants to delete;
3. clicks on DELETE, which causes the system 10 to prompt the user to accept or cancel the user's decision to delete;
4. clicks on an OK icon to continue the delete procedure; and
5. clicks on a CANCEL icon to cancel the delete procedure.

TRACKING GAMES

By accessing the GAME module, other information screens are displayed permitting a user to track games according to game names, game times and game locations, to record comments on plays and strategies, and to print such information for distribution to the team members.

Figure 20:
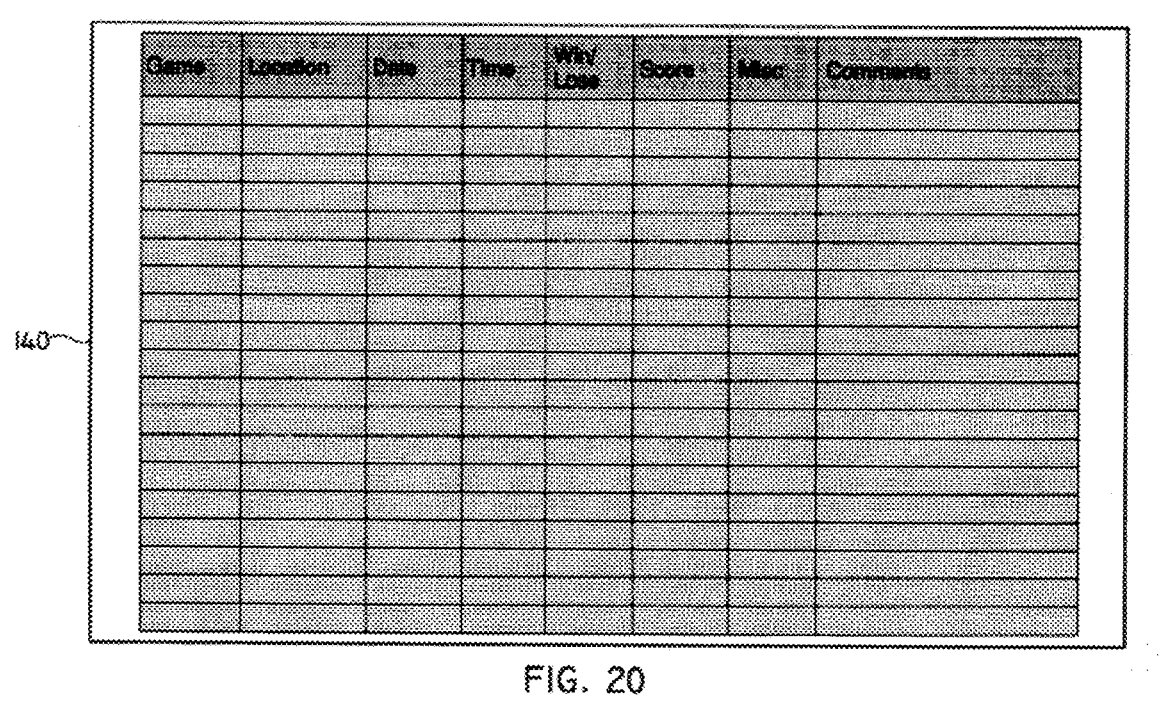

To open a game sheet; i.e. a input screen for inputting game information, the user clicks once on the GAME icon, and the system 10 generates the game sheet 140 as shown in FIG. 20 into which the user enters game information by the mouse and keyboard of the input device 12.

A) Entering Game Information

When the game sheet is opened, the cursor or mouse arrow icon is automatically positioned in an upper left-hand corner in a screen field for inputting the name, number or other designation of the game by:

1. typing the game name;
2. using the TAB key or right directional arrow key to move to the next field;
3. typing in the game location; and
4. continuing in this manner, using the TAB key or the directional arrow keys to move around on the game sheet 140 to input and/or edit the game information.

The user accepts the information typed into a currently active field by pressing the ENTER key, while pressing the escape (ESC) key blanks the currently active field.

B) Entering Comments on the Game

To activate a Comments Field on the game sheet 140, the user:

1. clicks on the pop-up arrow which opens a filed on the game sheet screen;
2. clicks once within the filed to place the cursor;
3. types in comments; and
4. closes the Comments field by clicking twice on the bar in the upper left corner of the field.

C) Adding Games to the Game Sheet

To add a game to the game sheet 140, the user:

1. positions the cursor at the end of the information fields of the last entered game;
2. presses the down arrow key which causes the system 10 to prompt the user to add another game; and
3. clicks on OK to add additional games.

D) Editing Game Information

The user may edit the game information using the game sheet 140, where the user:

1. selects the field for editing by clicking on the field once;
2. positions the cursor and clicks once to place the cursor;
3. positions the pointer and drags the pointer across multiple characters to edit more than one character; and
4. entering new data to the field.

The user may press the ENTER key to accept the information entered into the field, and may press the ESC key to under the entered information.

E) Adding Games to an Existing Game Sheet

To enter games on an existing game sheet, the user:

1. positions the arrow on the first empty NAME field under the NAME heading;
2. clicks the mouse button once; and
3. enters new game data to the empty NAME field.

F) Deleting a Game

To delete existing games from the game sheet, the user:

1. positions the arrow on the first letter of the game name to be deleted, causing the arrow to become a check mark;
2. clicks the mouse button to select all the fields of the information on the game;
3. presses the delete (DEL) key, causing the system 10 to prompt the user to accept or cancel the decision to delete by displaying an OK or CANCEL icon;
4. continues to delete by clicking the OK icon;
5. cancels the deleting procedure by pressing the CANCEL icon, thus returning the user to the roster with game still selected; and
6. clicks the mouse button once anywhere on the game sheet to clear the selection of the game.

G) Saving Game Information

To save the current game sheet, the user clicks on the SAVE icon in the TEAM pull-down menu.

H) Printing a Game Sheet

To print game sheets, the user:

1. clicks once on the PRINT icon;
2. selects the ALL icon to print all pages of the currently displayed game sheet;
3. selects the SELECTION icon or the RANGE icon to print only some of the pages of the displayed game sheet;
4. selects the SETUP icon to change the size, source, or orientation of the paper or to change printers; and
5. clicks on the OK icon to end the printing procedure.

In setting up the printing, the landscape orientation may be preferred in order to fit the greatest amount of the roster onto the page.

While the disclosed sports team organizing system and method has been particularly shown and described with reference to the preferred embodiments, it will be understood by those skilled in the art that various modifications in form and detail may be made therein without departing from the scope and spirit of the invention. Accordingly, modifications such as those suggested above, but not limited thereto, are to be considered within the scope of the invention.

What is claimed is:

1. An apparatus for organizing a sports team comprising:

a memory for storing roster information including player position data and player rating data for a plurality of players;

stored programs including a lineup optimizer program incorporating a plurality of optimizing rules and cooperating with ratings minima associated with team positions for application to the roster information; and a processor operating with the stored programs for processing the roster information using the lineup optimizer program to apply the optimizing rules to the player position data and the player rating data for comparison to the ratings minima and for generating an optimized lineup with each of the plurality of players assigned to a corresponding team position.

2. The apparatus of claim 1 wherein the memory stores roster information including biographical data for the plurality of players.

3. The apparatus of claim 1 further comprising an output device;

the stored programs include a drill program;

the memory stores drill data representing team and playing field images; and the processor operates with the drill program to process the drill data to generate a graphic representation of a drill; and the output device outputs the graphic representation.

4. The apparatus of claim 3 further comprising:

a graphic user interface for processing user selected commands and activated icons from the input device to control the processor; and an output device is controlled by the graphic user interface to output the graphic representation.

5. The apparatus of claim 1 wherein the processor, using the lineup optimizer program, responds to a first optimizer setting for determining at least a minimal optimized lineup having the corresponding rating of each of the players in the optimized lineup at least equal to the respective ratings minimum of the assigned team position of each player.

6. The apparatus of claim 5 wherein the processor responds to a higher ratings setting for determining a maximum optimized lineup having the corresponding rating of each player assigned to each respective team position as the maximum available rating for the assigned team position.

7. The apparatus of claim 1 wherein the processor receives input rating minima for each of a plurality of positions from an input device and determines the optimized lineup as a permutation of the plurality of players having associated ratings with each player having an assigned position in the permutation such that the associated rating of each player in the assigned position is at least equal to the respective rating minimum of the assigned position.

8. A computer system for organizing a sports team comprising:

an input device for inputting user commands and input data;

a memory for storing ratings minima associated with team positions and roster information including player position data and player rating data for a plurality of players;

stored programs including a lineup optimizer program incorporating a plurality of optimizing rules;

a processor operating with the stored programs using the user commands and input data for processing the roster information using the lineup optimizer program to apply the optimizing rules to the roster information for comparison to the ratings minima and for generating an optimized lineup with each of the plurality of players assigned to a corresponding team position; and an output device for outputting the optimized lineup of players with respective assigned team positions.

9. The computer system of claim 8 wherein the processor using the optimizing program responds to input game data including playing opportunities and rest periods to generate the optimized lineup.

10. The computer system of claim 8 wherein the memory stores roster information including biographical data for the plurality of players.

11. The computer system of claim 8 wherein the processor receives input rating minima for each of a plurality of positions from the input device and determines the optimized lineup as a permutation of the plurality of players having associated ratings with each player having a corresponding position such that the associated rating of each player is at least equal to the corresponding rating minimum of the corresponding position.

12. The computer system of claim 8 wherein the stored programs include a drill program;

the memory stores drill data representing team and playing field images;

the processor operates with the drill program to process the drill data to generate a graphic representation of a drill; and the output device outputs the graphic representation.

13. The computer system of claim 12 further comprising:

a graphic user interface for processing user selected commands and icons from the input device to control the processor; and the output device includes a display controlled by the graphic user interface to display the graphic representation.

14. An apparatus for organizing a sports team comprising:

an input device for receiving input commands;

a memory for storing roster information including player position data for a plurality of players;

stored programs including a drill graphic program;

a processor operating with the stored programs for processing the input commands using the drill graphic program to generate a graphic representation of a drill including a playing field and player information corresponding to each player; and an output device for outputting the graphic representation.

15. The apparatus of claim 14 wherein the player information including a graphics icon of a player positioned on the playing field.

16. The apparatus of claim 14 wherein the player information includes a text label positioned on the playing field.

17. A method for organizing a sports team comprising the steps of:

storing roster information including player position data and rating data for a plurality of players in a memory;

storing ratings minima for a plurality of team positions;

storing optimizing rules;

operating a processor using a lineup optimizer program to apply the optimizing rules to the roster information; and generating an optimized lineup of the plurality of players assigned to a respective team position with the corresponding player rating of each player at least equal to the respective rating minima of the assigned team position of the player.

18. The method of claim 17 further comprising the steps of:

receiving the roster information from a user through an input device.

19. The method of claim 17 further comprising the step of storing biographical data for the plurality of players in the memory.

20. The method of claim 17 further comprising the steps of:

storing drill data representing a predetermined drill;

operating the processor using a drill program and the drill data;

generating a graphic representation of the drill; and outputting the graphic representation using an output device.

21. The method of claim 20 further comprising the steps of:

receiving input rating minima for each of a plurality of team positions from an input device;

permutating the plurality of players having associated ratings with the plurality of team positions; and determining a permutation having the associated rating of each player at least equal to the corresponding minimum of corresponding position as the optimized lineup.

22. The method of claim 17 further comprising the steps of:

storing the roster information including rating data of the plurality of players; and processing the rating data using the processor to generate the optimized lineup.

23. The method of claim 22 further comprising the step of controlling the output device using a graphic user interface to output the graphic representation.

* * * * *